US010737346B2

(12) United States Patent
One et al.

(10) Patent No.: US 10,737,346 B2
(45) Date of Patent: Aug. 11, 2020

(54) WELDING ROBOT MECHANISM

(71) Applicant: Kabushiki Kaisha Kobe Seiko Sho (Kobe Steel, Ltd.), Hyogo (JP)

(72) Inventors: Tsutomu One, Kobe (JP); Takashi Wada, Kobe (JP); Shuichi Inada, Fujisawa (JP); Atsushi Fukunaga, Fujisawa (JP); Naoki Kida, Fujisawa (JP)

(73) Assignee: Kobe Steel, Ltd., Hyogo (JP)

( * ) Notice: Subject to any disclaimer, the term of this patent is extended or adjusted under 35 U.S.C. 154(b) by 152 days.

(21) Appl. No.: 16/075,180

(22) PCT Filed: Feb. 8, 2017

(86) PCT No.: PCT/JP2017/004626
§ 371 (c)(1),
(2) Date: Aug. 3, 2018

(87) PCT Pub. No.: WO2017/163644
PCT Pub. Date: Sep. 28, 2017

(65) Prior Publication Data
US 2019/0039161 A1 Feb. 7, 2019

(30) Foreign Application Priority Data
Mar. 23, 2016 (JP) .................. 2016-058667

(51) Int. Cl.
*B23K 9/00* (2006.01)
*B23K 9/095* (2006.01)
(Continued)

(52) U.S. Cl.
CPC .............. *B23K 9/0956* (2013.01); *B23K 9/10* (2013.01); *B23K 9/12* (2013.01); *B23K 9/127* (2013.01); *B25J 19/00* (2013.01); *B25J 19/02* (2013.01)

(58) Field of Classification Search
CPC .. B23K 9/0953; B23K 9/1087; B23K 9/0956; B23K 9/124; B23K 9/095; B23K 9/1006;
(Continued)

(56) References Cited

U.S. PATENT DOCUMENTS 6,278,082 B1    8/2001   Shimogama
6,984,805 B2    1/2006   Shimogama et al.
(Continued)

FOREIGN PATENT DOCUMENTS

EP    1123769 A2    8/2001
EP    2319649 A1    5/2011
(Continued)

OTHER PUBLICATIONS

The extended European search report issued by the European Patent Office dated Oct. 29, 2019, which corresponds to EP17769691.1-1016 and is related to U.S. Appl. No. 16/075,180.

*Primary Examiner* — Erin B Saad
(74) *Attorney, Agent, or Firm* — Studebaker & Brackett PC

(57) ABSTRACT

Provided is a welding robot mechanism that has: a welding robot having a touch sensing function; a welding power source for supplying welding power to the welding robot; and a control unit for controlling the welding robot, wherein the welding power source has a welding power source communication unit that receives detection signals with regard to control of the welding robot and the touch sensing, and transmits the detection signals outward. The control unit is linked to the welding power source communication unit via a serial bus communication wire. The detection signals comprise a mass of data including a detection data group designated as a first group and a detection data group designated as a second group, and is configured to read the detection data group designated as the first group in a shorter cycle than that for the detection data group designated as the
(Continued)

second group. The detection data group designated as the first group includes a detection signal obtained by the touch sensing.

5 Claims, 2 Drawing Sheets

(51) Int. Cl.
*B23K 9/10* (2006.01)
*B23K 9/127* (2006.01)
*B23K 9/12* (2006.01)
*B25J 19/00* (2006.01)
*B25J 19/02* (2006.01)

(58) Field of Classification Search
CPC .. B23K 9/1043; B23K 9/1056; B23K 9/1062; B23K 9/10; B23K 9/32; B23K 9/1735; B23K 9/173; B23K 9/093; B23K 9/126; B23K 9/127; B23K 9/167; B23K 9/09; B23K 9/091; B23K 9/092; B23K 9/1075; B23K 9/1093; B23K 9/125; B23K 10/006; B23K 37/00; B23K 37/0247; B23K 37/0435; B23K 9/0026; B23K 9/0216; B23K 9/06; B23K 9/0735; B23K 9/1068; B23K 9/1081; B23K 9/12; B23K 9/121; B23K 9/122; B23K 9/1274; B23K 9/1278; B23K 9/164; B23K 9/186; B23K 9/28; B23K 9/287; B23K 9/323

See application file for complete search history.

(56) References Cited

U.S. PATENT DOCUMENTS

| | | | |
|---|---|---|---|
| 9,044,817 B2 | 6/2015 | Fukunaga et al. | |
| 2011/0108536 A1* | 5/2011 | Inada | B23K 9/0953 219/130.1 |
| 2011/0301733 A1 | 12/2011 | Yoshima et al. | |
| 2013/0087542 A1 | 4/2013 | Yoshima et al. | |

FOREIGN PATENT DOCUMENTS

| | | |
|---|---|---|
| JP | 2005-005951 A | 1/2005 |
| JP | 2015-184892 A | 10/2015 |
| WO | 2010/098030 A1 | 9/2010 |

* cited by examiner

WELDING ROBOT MECHANISM

TECHNICAL FIELD

The present invention relates to welding robot mechanisms, and particularly, to a technology in touch sensing using a welding robot.

BACKGROUND ART

Industrial robots are an example of robots whose orientations are set in accordance with changes in the angles of joints. For example, when welding is to be performed by using a welding robot, which is a type of an industrial robot, there is operation called touch sensing for sensing the position of a workpiece to be welded.

Touch sensing is sensing operation that involves moving the welding robot in a state where a voltage is applied to a welding torch and detecting a position where a welding wire of the welding torch comes into contact with the workpiece (that is, a position where an electric current between the workpiece and the welding wire is detected) as a workpiece position. In this touch sensing, the workpiece position is normally detected based on the orientation of the robot (i.e., the angle of a motor for each joint of the robot) when contact with the workpiece is detected.

Patent Literatures 1 to 3 disclose examples of the technology for detecting the workpiece position.

Patent Literature 1 discloses an electrode-position control method in tandem arc welding for controlling the positions of a leading electrode and a trailing electrode relative to a welding line before starting a welding process. The electrode-position control method in tandem arc welding includes: a voltage detecting step involving using current-voltage detecting means to detect voltages of the leading electrode and the trailing electrode brought into contact with a weld workpiece to be welded; a sensing step involving using sensing means to detect positional information about the weld workpiece from electrical changes in the voltages of the leading electrode and the trailing electrode detected in the voltage detecting step; a correction-amount calculating step involving using correction-amount calculating means to calculate a correction amount for correcting positional deviations of the leading electrode and the trailing electrode relative to the welding line, which is preliminarily taught, from the positional information about the weld workpiece detected in the sensing step; a position correcting step involving using robot-trajectory planning means to add or subtract the correction amount calculated in the correction-amount calculating step so as to correct the positions of the leading electrode and the trailing electrode relative to the welding line.

Patent Literature 2 discloses an arc welding apparatus including a robot control device, a welding power source, and an arc sensor control unit that detects an actual welding condition including at least one of a welding current and a welding voltage used during a welding process and that corrects a welding path or a welding condition. The robot control device, the welding power source, and the arc sensor control unit are connected by a bus. At least one of a welding condition required in the welding process and the actual welding condition including at least one of the welding current and the welding voltage used during the welding process is digitally transmitted among the robot control device, the welding power source, and the arc sensor control unit via the bus in accordance with a parallel method. The welding voltage and the welding current are detected by a voltage detector and a current detector provided only in the welding power source.

Patent Literature 3 discloses a welding apparatus including a combination of a robot control device and a control unit of a welding power source. Each of the robot control device and the control unit of the welding power source is of a digital control type and has a digital communication control unit. A welding condition command including at least a welding current command value is transmitted from the robot control device to the control unit of the welding power source and an arc answer is transmitted from the control unit of the welding power source to the robot control device via the communication control unit in accordance with the digital amount.

CITATION LIST

Patent Literature

PTL 1: Japanese Patent No. 5498264
PTL 2: Japanese Patent No. 3736411
PTL 3: Japanese Patent No. 3307886

SUMMARY OF INVENTION

Technical Problem

In touch sensing, immediate stoppage is necessary when a welding wire is to be brought into contact with a workpiece (see FIG. 3).

The reason for this is that a welding torch moves at high speed and that the welding torch may possibly detect a position different from the originally-intended workpiece position unless the welding robot is immediately stopped when the welding wire is brought into contact with the workpiece. In other words, there is a possibility of a false detection in which a position deviated from the actual workpiece position is detected as the workpiece position.

Furthermore, when the stoppage operation is to be actually performed after a welding-torch stoppage command is output, if it takes too much time to perform the stoppage operation (i.e., if the time lag is too long), the welding wire may move significantly during that time, which is problematic in that the welding wire may bend.

In touch sensing, in order to avoid the problem of a false detection of the workpiece position, detection signals related to the welding robot are transmitted in a short cycle (i.e., at a high frequency). By transmitting the detection signals in a short cycle, the orientation of the welding robot can be ascertain in real time.

A control unit that controls the operation of the welding robot tries to read all of the detection signals transmitted in a short cycle and perform processing so as to control the welding robot with high accuracy.

However, when the control unit tries to read all of the detection signals transmitted in a short cycle and perform processing, there is a possibility that some detection data may be lost from the detection signals transmitted in a short cycle due to a high load.

In particular, in tandem arc welding (for example, see Patent Literature 1) in which touch sensing is performed using two welding torches, if the processing unit tries to read all of the detection signals in a short cycle, an extremely high load is applied thereto, possibly losing detection data of high importance in particular, such as touch-sensing detection data and detection data indicating an abnormality of a welding power source.

If high-importance detection data of the welding robot is lost in this manner, it becomes impossible to immediately stop the welding robot, possibly resulting in a situation where on-site safety cannot be ensured.

As a conceivable method for solving such problems, for example, the controller of the welding robot uses a parallel bus or an analog line to directly read a detection signal from a welding power source detection unit that performs touch sensing, as in Patent Literatures 1 to 3. However, this method lacks versatility since a dedicated DPRAM or a dedicated wire is required. In addition, providing the welding robot with a device for directly reading the aforementioned detection signal leads to an increase in cost due to the device.

The present invention has been made in view of the aforementioned problems, and an object thereof is to provide a welding robot mechanism that can read detection data of high importance included in a detection signal, in a case where the detection signal is read in a short cycle in touch sensing, without losing the detection data so that the welding robot can be immediately stopped at a desired position in stoppage operation thereof.

Solution to Problem

In order to solve the aforementioned problems, the present invention provides the following technical solutions.

The present invention provides a welding robot mechanism including: a welding robot equipped with a welding torch and having a touch sensing function for sensing a workpiece position; a welding power source for supplying welding power to the welding robot; and a control unit for controlling the welding robot. The welding power source has a welding power source communication unit that receives detection signals related to control of the welding robot and the touch sensing and that transmits the detection signals outward. The control unit has a control communication unit that is linked to the welding power source communication unit via a serial bus communication line and that receives the detection signals transmitted from the welding power source communication unit, and a processing unit that reads and processes the detection signals. The detection signals comprise a mass of data including a detection data group designated as a first group and a detection data group designated as a second group. The detection data group designated as the first group includes a detection signal obtained by the touch sensing. The processing unit is configured to read the detection data group designated as the first group in a shorter cycle than that for the detection data group designated as the second group.

The detection data group designated as the first group may include a detection signal indicating an abnormality of the welding power source.

The welding robot may include a plurality of the welding torches. The detection signals may be detected with respect to each of the plurality of welding torches. The detection data group designated as the first group may include data of the same type with respect to each of the plurality of welding torches. The detection data group designated as the second group may include data of the same type with respect to each of the plurality of welding torches.

In the mass of data, the detection data group designated as the first group may be disposed at a leading section of the mass of data.

The processing unit may be configured to read the detection data group designated as the first group in a cycle of 5 msec or shorter.

According to the present invention, in a case where a detection signal is to be read in a short cycle in touch sensing, the detection data group designated as the first group including the detection signal obtained by the touch sensing is read in a shorter cycle than that for the detection data group designated as the second group. Detection data of high importance is read in a shorter cycle in this manner so that detection data of high importance included in the detection signal is read without being lost. Consequently, for example, the welding robot can be immediately stopped at a desired position in stoppage operation thereof.

DESCRIPTION OF EMBODIMENTS

An embodiment of a welding robot mechanism 1 according to the present invention will be described in detail below based on the drawings.

Identical components shared among embodiments to be described below are given identical reference signs and identical names. Therefore, descriptions of components given identical reference signs and identical names will not be repeated.

First, a general mechanism and control method of a welding robot 2 according this embodiment will be described.

The welding robot 2 is an articulated robot that has at least one joint and that moves and changes its orientation by changing the angle of the joint in accordance with rotation of a motor. A control unit 7 that controls the welding robot 2 changes the angle of the joint by controlling the rotation of the motor, thereby operating the welding robot 2.

In the following description of the welding robot mechanism 1, a welding robot mechanism used in tandem arc welding will be exemplified.

Figure 1:
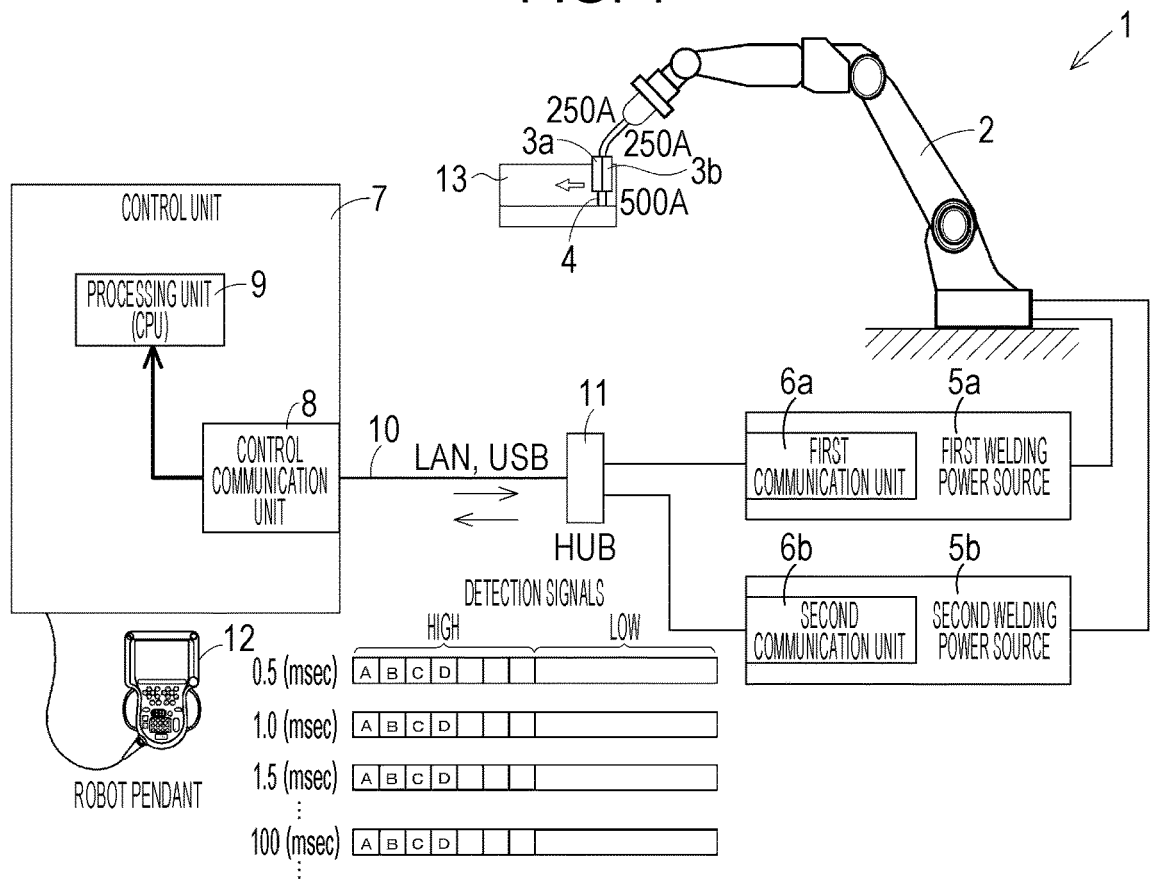
FIG. 1 schematically illustrates the overall configuration of a tandem arc welding robot according to an embodiment of the present invention.

FIG. 1 schematically illustrates the configuration of the welding robot mechanism 1 used in tandem arc welding.

The welding robot 2, which is an articulated robot, includes a plurality of joints and has a distal-end shaft to which at least two welding torches 3 are attached. Tandem arc welding is performed by using welding wires 4 fed from the welding torches 3.

For example, the welding robot 2 performs operation (weaving operation) for moving the welding torches 3 in a welding line direction connecting a welding start point and a welding end point, while tilting the welding wires 4 with a predetermined amplitude and frequency. Although such operation of the welding robot 2 is controlled by the control unit 7, the operation is taught to the control unit 7 in advance.

The control unit 7 has a robot pendant 12 used as a teaching pendant. The control unit 7 outputs an operation command to the welding robot 2 based on operational command information output from the robot pendant 12 for commanding the moving direction of the welding robot 2, and also outputs an operational command to the welding robot 2 in accordance with a preliminarily-taught program (teaching program), thereby controlling the operation of the welding robot 2.

The operational command information is set by operating an operation button provided in the robot pendant 12.

The teaching program is created in advance by using, for example, the robot pendant 12 connected to the control unit 7 before the welding robot 2 actually performs a welding process. The operation of the welding robot 2 during a welding process is commanded in accordance with this teaching program.

As shown in FIG. 1, the welding robot mechanism 1 according to this embodiment has the welding robot 2 equipped with two welding torches 3a and 3b at the distal end thereof, a leading-electrode welding power source (first welding power source) 5a for supplying welding power to the first welding torch 3a (leading electrode), a trailing-electrode welding power source (second welding power source) 5b for supplying welding power to the second welding torch 3b (trailing electrode), and the control unit 7 for controlling the welding robot 2.

The welding robot mechanism 1 has a touch sensing function for sensing a workpiece position. Specifically, the welding robot mechanism 1 detects contact between the welding wires 4 and a workpiece 13 by utilizing the characteristics in which an electric current flows therebetween when the welding wires 4 come into contact with the workpiece 13 in a state where a voltage is applied to the welding wires 4. Having this function can also be regarded as having a wire touch sensor.

The welding robot mechanism 1 has a leading-electrode welding power source communication unit (first welding power source communication unit) 6a and a trailing-electrode welding power source communication unit (second welding power source communication unit) 6b. The leading-electrode welding power source communication unit 6a is contained in the leading-electrode welding power source 5a, receives a detection signal including a signal of high importance in the control of the welding robot 2, and transit the detection signal outward. The trailing-electrode welding power source communication unit 6b is contained in the trailing-electrode welding power source 5b, receives a detection signal including a signal of high importance in the control of the welding robot 2, and transits the detection signal outward.

The signal of high importance to be received by the leading-electrode welding power source communication unit 6a is a signal including a detection signal (data) according to touch sensing of the leading electrode 3a and a detection signal (data) indicating an abnormality of the leading-electrode welding power source 5a.

The signal of high importance to be received by the trailing-electrode welding power source communication unit 6b is a signal including a detection signal according to touch sensing of the trailing electrode 3b and a signal including a detection signal indicating an abnormality of the trailing-electrode welding power source 5b.

Examples of an abnormality of a welding power source include a temperature abnormality inside the welding power source, a CPU abnormality inside the welding power source, and a phase loss of an input power source of the welding power source.

The control unit 7 includes a control communication unit 8 that receives the detection signals transmitted from the welding power source communication units 6a and 6b, and also includes a processing unit 9 that reads and processes the detection signals.

The welding power source communication units 6a and 6b and the control communication unit 8 are connected via a communication line 10. Examples of the communication line 10 include a field network, a local area network (LAN), and a universal serial bus (USB). In this embodiment, two communication lines 10 from the welding power source communication units 6a and 6b are grouped together at a hub 11 so as to be connected to the control communication unit 8.

In a case where a detection signal is to be read in a short cycle in touch sensing, it is necessary to read the detection signal without losing detection data of high importance included therein.

Thus, in the welding robot mechanism 1 according to this embodiment, detection signals related to the welding robot 2, such as touch-sensing detection data of each of the electrodes 3a and 3b and detection data indicating an abnormality of each of the welding power sources 5a and 5b, are transmitted by using a serial bus instead of a parallel bus or an analog line.

Currently, serial-bus-based communication is the mainstream in data communication, and the transition to serial-bus-based communication has been made even in welding robots 2. Furthermore, for example, when performing serial-bus-based communication for data of high importance, such as touch-sensing detection data of each of the electrodes 3a and 3b and detection data indicating an abnormality of each of the welding power sources 5a and 5b, event-type communication has been performed in the past. However, the transition to a periodical cycle type has been made in accordance with an increase in speed of communication cycles.

Figure 2:
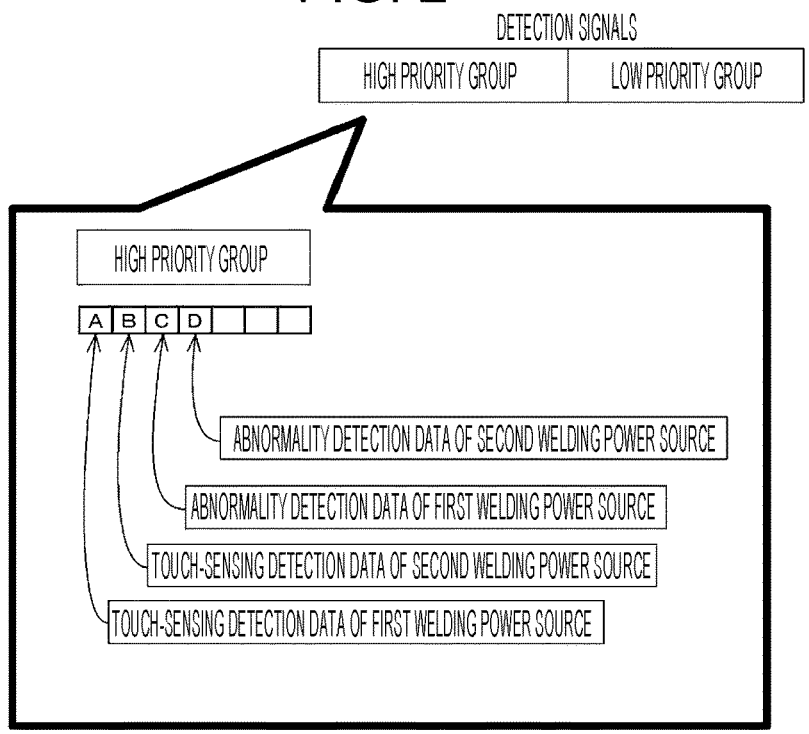
FIG. 2 schematically illustrates detection signals according to the embodiment of the present invention.

As shown in FIG. 2, detection signals to be sequentially detected are classified into detection data of high importance (urgency) and detection data of low importance.

With regard to detection signals in this embodiment, pieces of detection data of high importance are compiled as a high priority group, and pieces of detection data of low importance are compiled as a low priority group.

The detection signals are set as a mass (packet) by combining the high priority group and the low priority group together and are transmitted in a short cycle within the communication line 10 for each packet via the communication line 10.

The detection data of high importance (high priority data) changes momentarily and needs to be acquired in real time.

Specifically, high priority data needs to be read every time it is to be transmitted. Examples of the high priority data include touch-sensing detection data of each of the electrodes 3a and 3b and detection data indicating an abnormality of each of the welding power sources 5a and 5b.

The detection data of low importance (low priority data) is required for the operation of the welding robot 2, but does not change rapidly and thus does not need to be acquired immediately.

Specifically, low priority data may be read at predetermined intervals. Examples of the low priority data include a value to be simply displayed on the robot pendant 12, such as an average current value and an average voltage value.

In tandem arc welding, high priority data related to the leading electrode 3a, high priority data related to the trailing electrode 3b, high priority data related to the leading-electrode welding power source 5a, and high priority data related to the trailing-electrode welding power source 5b are compiled as a high priority group.

Furthermore, low priority data related to the leading electrode 3a, low priority data related to the trailing electrode 3b, low priority data related to the leading-electrode welding power source 5a, and low priority data related to the trailing-electrode welding power source 5b are compiled as a low priority group.

With regard to the detection signals related to the leading electrode 3a and the trailing electrode 3b and the detection signals related to the welding power sources 5a and 5b, the high priority group and the low priority group are combined into a single packet, and each packet is transmitted in a short cycle within the communication line 10.

With regard to the detection signals, the compiled high priority data (high priority group) may be disposed at the leading section within a single packet.

Accordingly, with regard to the detection signals, pieces of high priority data, such as touch-sensing detection data of each of the electrodes 3a and 3b and detection data indicating an abnormality of each of the welding power sources 5a and 5b, are compiled and disposed at one section of a communication frame so that a section to be read is limited, whereby a loss of high priority data can be eliminated.

The detection signals may be transmitted in a cycle of 5 msec or shorter.

By setting the transmission cycle as described above, an excessive feed amount (travel amount) of the welding wires 4 can be suppressed. For example, in a case where the welding wires 4 touch the workpiece 13 at 300 cm/min, the excessive feed amount of the welding wires 4 according to communication is suppressed to 0.25 mm, so that the welding wires 4 can be prevented from bending.

Figure 3:
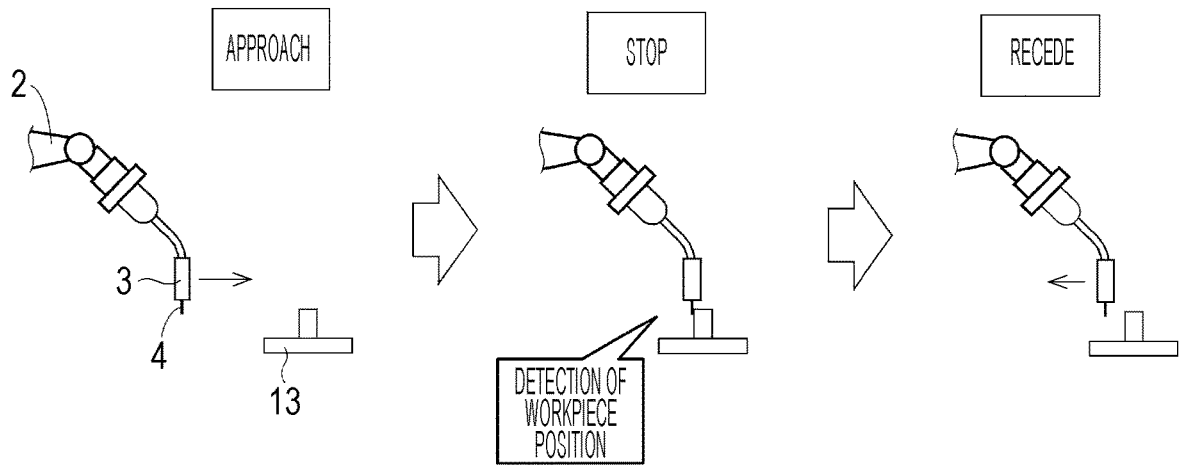
FIG. 3 schematically illustrates touch sensing.

As shown in FIG. 3, in touch sensing, it is necessary to immediately stop the welding wires 4 when the welding wires 4 come into contact with the workpiece 13, so as to prevent a position deviated from the actual workpiece position from being falsely detected as the position of the workpiece 13.

In this embodiment, of the detection signals related to the leading electrode 3a and the trailing electrode 3b transmitted to the control communication unit 8 and the detection data related to each of the welding power sources 5a and 5b, the processing unit 9 (CPU) contained in the control unit 7 only reads high priority data in a short cycle every time for each packet. In contrast, the processing unit 9 reads low priority data of the detection signals in a fixed cycle. Specifically, the low priority data of the detection signals is not read every time.

When the detection signals are transmitted in a cycle of, for example, 5 msec, the processing unit 9 reads only high priority data every 5 msec. Moreover, the processing unit 9 reads low priority data in a fixed cycle of, for example, 100 msec so as not to lower the processing rate.

Accordingly, the processing unit 9 reads high priority data alone for every transmission and reads low priority data in a fixed cycle that is longer than the transmission cycle, thereby reducing the load on the processing unit 9 and eliminating a loss of high priority data. The reading cycle for low priority data may be set by experimentally determining a cycle that prevents a loss of high priority data from occurring. Alternatively, if the cycle in which low priority data is processed by the control unit 7 is sufficiently long, the reading cycle for low priority data may be adjusted to the processing cycle in the control unit 7.

Instead of reading all types of low priority data in a single low-priority-data reading process, it is preferable that the low priority data be divided into several groups such that a single low-priority-data reading process is performed only for a single group of data and that the reading process is performed alternately from group to group. Specifically, it is preferable that the reading processes for various types of data included in the low priority data be temporally distributed, so as to prevent concentration of the data reading load to the low-priority-data reading process.

The low priority data may be further classified into multiple levels such that, for example, data to be read every 100 msec and data to be read every 200 msec are mixed within the low priority data.

Operational Mode

An operational mode of the welding robot mechanism 1 according to this embodiment will now be described.

Detection signals including high priority data, such as touch-sensing detection data of the welding torches 3 and abnormality detection data of the welding power sources 5 are transmitted from the welding power sources 5a and 5b to the control unit 7 as scheduled communication in a cycle of, for example, 5 msec and even a shorter time period of 0.5 msec. In the control communication unit 8 within the control unit 7, reception is performed every 0.5 msec. Moreover, the high priority data is disposed at the leading section of the detection signals.

If the processing unit 9 is to read all pieces of data (high priority data and low priority data) included in the detection signals transmitted from the welding power sources 5 every 0.5 msec, the detection signals become an enormous amount of data since they are transmitted every 0.5 msec, thus leading to an insufficient processing time.

This results in a lag of data processing, possibly losing a portion of the high priority data. This makes it impossible to stop the welding torches 3 immediately. Even if the welding torches 3 can be stopped, punctuality is impaired, thus adversely affecting the detection accuracy for the workpiece 13.

The processing unit 9 according to this embodiment reads high priority data alone at a high frequency of every 0.5 msec. High priority data includes touch-sensing detection data of the welding torches 3 and abnormality detection data of the welding power sources 5.

On the other hand, low priority data, such as an average current value and an average voltage value, to be simply displayed on the robot pendant 12 is read, for example, (at a low frequency of) every 180 msec to 200 msec instead of every 0.5 msec.

As shown in FIGS. 1 and 2, in tandem arc welding, for example, touch-sensing detection data (denoted by A in FIGS. 1 and 2) of the leading electrode 3a, touch-sensing detection data (denoted by B in FIGS. 1 and 2) of the trailing electrode 3b, abnormality detection data (denoted by C in FIGS. 1 and 2) of the leading-electrode welding power source 5a, and abnormality detection data (denoted by D in FIGS. 1 and 2) of the trailing-electrode welding power source 5b are compiled as a high priority group and are disposed at the leading section of the packet (8-bit section in the example in FIG. 1). The processing unit 9 collectively reads the high priority data disposed at the leading section of the packet.

Accordingly, the processing is increased in speed and a loss of high priority data is eliminated, so that the welding torches 3a and 3b can be stopped reliably and immediately.

As a method for instantly monitoring touch sensing detection, it is conceivable that a change in a touch sensing flag is monitored every 0.5 msec.

For example, a touch sensing flag notified from each of the welding power sources 5a and 5b is monitored by the processing unit 9 within the control unit 7, and it is assumed that touch sensing is detected when the flag changes from 0 to 1. In contrast, when the flag changes from 1 to 0, it may be recognized that the welding wires 4 have moved away from the workpiece 13.

In tandem arc welding, the welding power sources 5 are not limited to the two exemplified welding power sources, and four or eight welding power sources are sometimes connected. The present invention is applicable to a case where many welding power sources 5 are connected.

Figure 4:
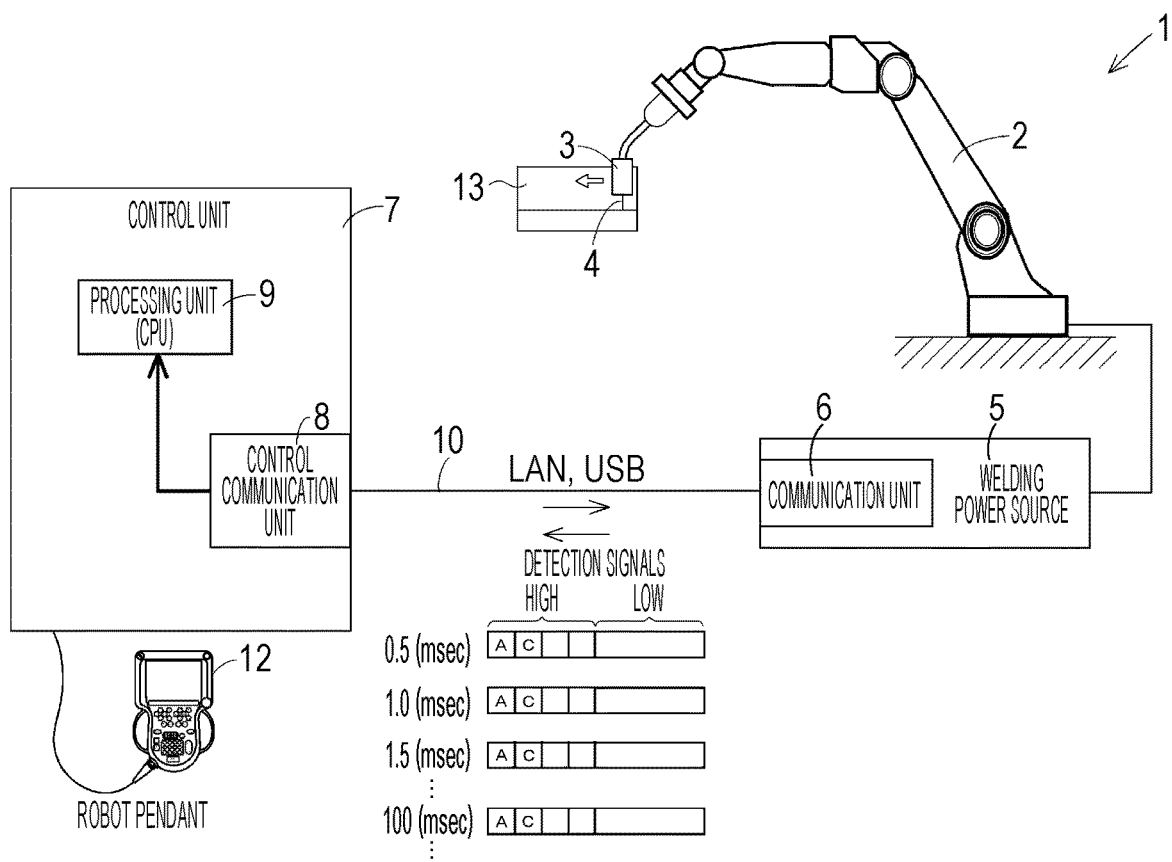
FIG. 4 schematically illustrates the overall configuration of an arc welding robot according to an embodiment of the present invention.

As shown in FIG. 4, the present invention is applicable to a welding robot mechanism 1 in which a single welding torch 3 is provided at the distal end of the welding robot 2, a single welding power source is provided, and the welding power source communication unit 6 within the welding power source 5 is connected to the control communication unit 8 within the control unit 7 via the communication line 10.

The high priority group may be disposed at a section other than the leading section in the packet.

The present application is based on Japanese Patent Application No. 2016-058667 filed on Mar. 23, 2016, the contents of which are hereby incorporated by reference.

REFERENCE SIGNS LIST 1 welding robot mechanism
2 welding robot
3 welding torch
3a first welding torch (leading electrode)
3b second welding torch (trailing electrode)
4 welding wire
5 welding power source
5a leading-electrode welding power source (first welding power source)
5b trailing-electrode welding power source (second welding power source)
6 welding power source communication unit
6a leading-electrode welding power source communication unit (first welding power source communication unit)
6b trailing-electrode welding power source communication unit (second welding power source communication unit)
7 control unit
8 control communication unit
9 processing unit
10 communication line
11 hub
12 robot pendant
13 workpiece

The invention claimed is:

1. A welding robot mechanism comprising:
a welding robot equipped with a welding torch and having a touch sensing function for sensing a workpiece position;
a welding power source for supplying welding power to the welding robot; and
a control unit for controlling the welding robot,
wherein the welding power source has a welding power source communication unit that receives detection signals related to control of the welding robot and the touch sensing and that transmits the detection signals outward,
wherein the control unit has
a control communication unit that is linked to the welding power source communication unit via a serial bus communication line and that receives the detection signals transmitted from the welding power source communication unit, and
a processing unit that reads and processes the detection signals,
wherein the detection signals comprise a mass of data including a detection data group designated as a first group and a detection data group designated as a second group,
wherein the detection data group designated as the first group includes a detection signal obtained by the touch sensing, and
wherein the processing unit is configured to read the detection data group designated as the first group in a shorter cycle than that for the detection data group designated as the second group.

2. The welding robot mechanism according to claim 1, wherein the detection data group designated as the first group includes a detection signal indicating an abnormality of the welding power source.

3. The welding robot mechanism according to claim 1, wherein the welding robot includes a plurality of the welding torches,
wherein the detection signals are detected with respect to each of the plurality of welding torches,
wherein the detection data group designated as the first group includes data of the same type with respect to each of the plurality of welding torches, and
wherein the detection data group designated as the second group includes data of the same type with respect to each of the plurality of welding torches.

4. The welding robot mechanism according to claim 1, wherein, the mass of data is a single packet of data, and the detection data group designated as the first group is disposed at a leading section of the single packet of data.

5. The welding robot mechanism according to claim 1, wherein the processing unit is configured to read the detection data group designated as the first group in a cycle of 5 msec or shorter.

* * * * *